United States Patent [19]

Katada

[11] 4,245,600
[45] Jan. 20, 1981

[54] CONTACTLESS IGNITION SYSTEM FOR INTERNAL COMBUSTION ENGINE

[75] Inventor: Hirosi Katada, Katsuta, Japan

[73] Assignee: Hitachi, Ltd., Japan

[21] Appl. No.: 48,909

[22] Filed: Jun. 15, 1979

[30] Foreign Application Priority Data

Jun. 23, 1978 [JP] Japan .................. 53/75349

[51] Int. Cl.³ .................................... F02P 5/04
[52] U.S. Cl. ................................ 123/415; 123/418; 123/611
[58] Field of Search ............ 123/117 R, 117 D, 148 E

[56] References Cited

U.S. PATENT DOCUMENTS

| 3,705,573 | 12/1972 | Palazzetti et al. | 123/117 R X |
| 3,888,220 | 6/1975 | Bigalke et al. | 123/117 R |
| 4,122,807 | 10/1978 | Hosaka et al. | 123/117 R |
| 4,142,490 | 3/1979 | Hosaka et al. | 123/117 R |
| 4,164,204 | 8/1979 | Guipaud | 123/148 E X |
| 4,201,163 | 5/1980 | Hattori et al. | 123/117 R |

FOREIGN PATENT DOCUMENTS 43-17131  7/1968 Japan .

Primary Examiner—Tony M. Argenbright
Attorney, Agent, or Firm—Craig & Antonelli

[57] ABSTRACT

A contactless ignition system of current interruption type for an internal combustion engine comprising at least one pulser device sensing a predetermined maximum advance position and a predetermined minimum advance position of the ignition timing to generate an output signal indicative of such advance positions. On the basis of the output signal of the pulser, a first ramp signal having a first gradient and a second ramp signal having a second gradient are produced, and a signal representing the sum of a reference signal of a constant level and the second ramp signal is compared in a comparator with the first ramp signal. When level coincidence is reached between these two signals, the comparator generates a control signal controlling the turn-on position of a semiconductor switch which controls the ignition timing, so that the duration of current supply for ignition can be maintained substantially constant throughout the rotation speed ranges of the engine.

4 Claims, 8 Drawing Figures

CONTACTLESS IGNITION SYSTEM FOR INTERNAL COMBUSTION ENGINE

This invention relates to a contactless ignition system of current interruption type for an internal combustion engine, and more particularly to a system of the kind above described which controls electronically the conduction or on-off ratio of a semiconductor switch for controlling the ignition timing of the engine.

A contactless ignition system of current interruption type for an internal combustion engine is widely known, in which a semiconductor switch which includes a power transistor is connected to a primary winding of an ignition coil and is periodically turned on and off to induce a high voltage across a secondary winding of the ignition coil so that this high voltage can be distributed to spark plugs of the engine. In the prior art contactless ignition system of this kind, the period of time during which the power transistor is turned on and then turned off is maintained constant and corresponds to a predetermined crank angle irrespective of the rotation speed of the engine. The prior art contactless ignition system of current interruption type has therefore been defective in that the duration of current supply to the power transistor is progressively shortened at higher rotation speeds of the engine, and the number of times of ignition per unit time increases with the increase in the rotation speed of the engine, resulting in reductions in the amount of energy available for ignition. While this defect can be obviated when the turn-on angle for the power transistor is selected to be large enough to provide a sufficiently large amount of ignition energy at high rotation speeds, this attempt has given rise to such another defect that the power consumption increases inevitably at intermediate rotation speeds of the engine.

A method for controlling the conduction or on-off ratio of a power transistor in an ignition system for an internal combustion engine is also well known and is disclosed in, for example, Japanese Patent Publication No. 43-17131. In the method disclosed in this Japanese patent, a monostable multivibrator is employed for controlling the on-off of the power transistor. This method has however been defective in that mal-ignition of the engine tends to occur when the vehicle is abruptly started, since circuit oscillations appear in such an event. The above method has also been defective in that ignition cannot follow up an abrupt rate of acceleration of the engine resulting in impossibility of stable ignition of the engine.

It is therefore a primary object of the present invention to provide a novel and improved contactless ignition system of current interruption type for an internal combustion engine, which ensures the desired sparking performance at high rotation speeds of the engine and yet which can minimize the power consumption at low and intermediate rotation speeds of the engine.

In accordance with the present invention, there is provided a contactless ignition system of current interruption type for an internal combustion engine comprising a rotor of a magnetic material rotating in synchronism with the rotation of the engine and having means for sensing the ignition angle, means for controlling the advance of the ignition timing of the engine, a semiconductor switch circuit actuated by an ignition signal appearing from the advance control means, and an ignition coil connected to the semiconductor switch circuit, the advance control means comprising means for sensing a predetermined maximum advance position of the ignition timing, means for sensing a predetermined minimum advance position of the ignition timing, a first integrating circuit starting its integrating operation as soon as the maximum advance position sensing means senses the maximum advance position of the ignition timing and terminating its integrating operation as soon as the minimum advance position sensing means senses the minimum advance position of the ignition timing thereby generating a first ramp signal, a second integrating circuit starting its integrating operation as soon as the minimum advance position sensing means senses the minimum advance position of the ignition timing and terminating its integrating operation as soon as the maximum advance position sensing means senses the maximum advance position of the ignition timing thereby generating a second ramp signal, summing means for providing an output signal representing the sum of a signal of a predetermined constant level and the output signal of the second integrating circuit, and a comparing circuit applying a power supply starting signal to the semiconductor switch circuit connected to the ignition coil when the level of the output signal of the summing means coincides with the level of the output signal of the first integrating circuit, whereby a stable ignition control signal can be applied to the semiconductor switch circuit.

The above and other objects, features and advantages of the present invention will become more apparent from the following detailed description of a preferred embodiment thereof taken in conjunction with the accompanying drawings, in which:

FIG. 1 is a block circuit diagram of an ignition control section in a preferred embodiment of the contactless ignition system of current interruption type for an internal combustion engine according to the present invention;

FIGS. 2(a) to 2(i) show waveforms of output signals from various circuit parts in FIG. 1 to illustrate the operation of the circuit shown in FIG. 1;

Figure 1:
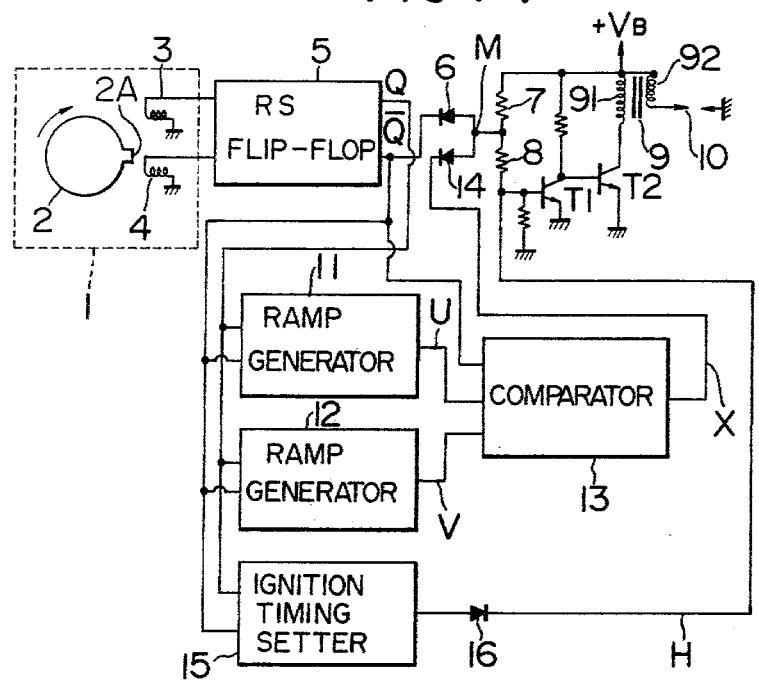
Figure 4:
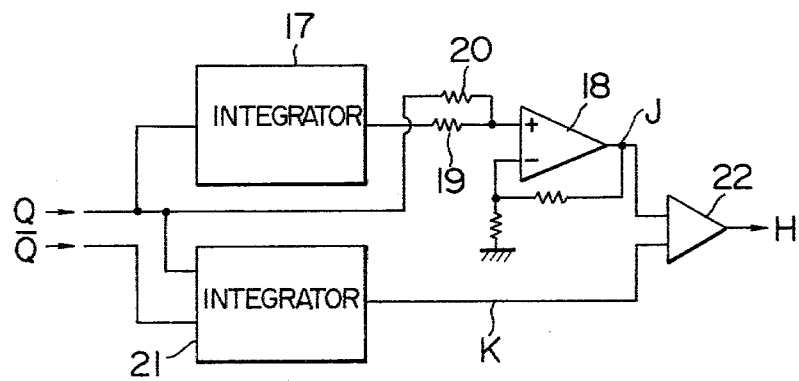
FIG. 4 is a block circuit diagram showing the structure of one form of the ignition timing setting circuit shown in FIG. 1.
Figure 6:
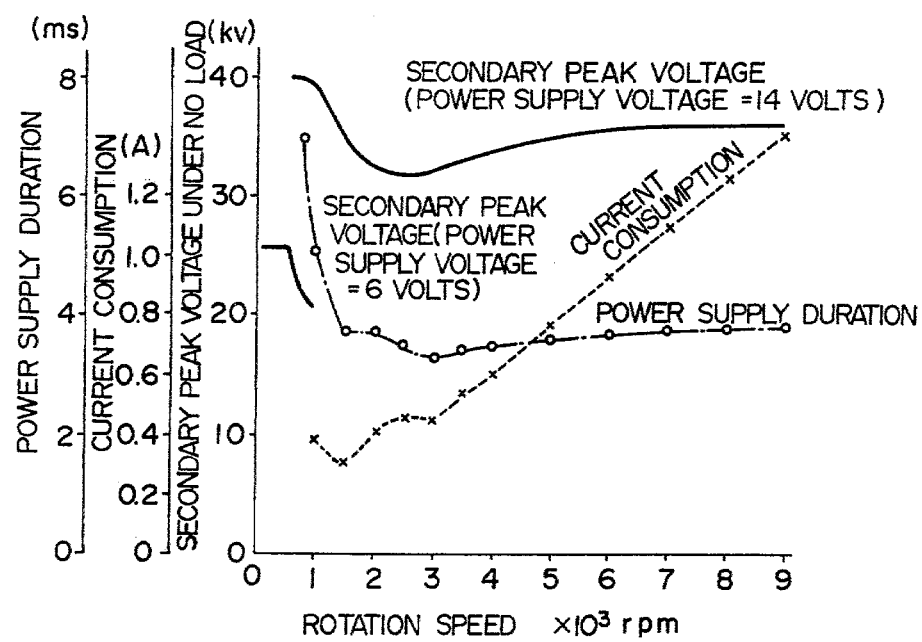
Figure 7:
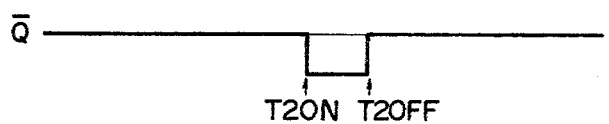
Figure 8:

FIGS. 5(a) to 5(g) show waveforms of output signals from various circuit parts in FIG. 4 to illustrate the operation of the circuit shown in FIG. 4;

FIG. 6 is a graph showing the current consumption of the ignition circuit and the duration of power supply to the power transistor relative to the rotation speed of the engine;

FIG. 7 shows the waveform of the output signal appearing from the flip-flop shown in FIG. 1 when the turn-on timing and the turn-off timing of the power transistor shown in FIG. 1 are not advanced; and FIG. 8 shows the waveform of the flip-flop output signal when it is required to advance the turn-on timing and the turn-off timing of the power transistor shown in FIG. 1.

Figure 2:
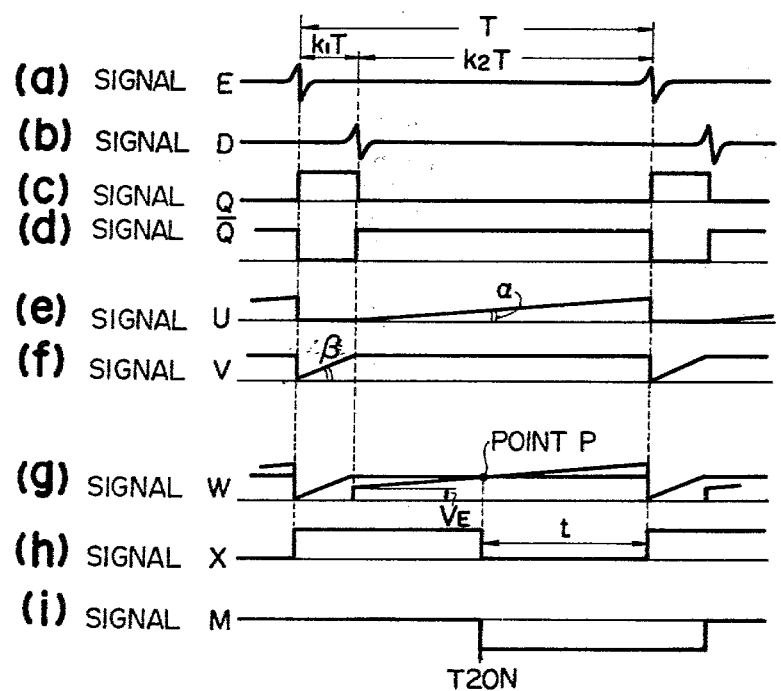

A preferred embodiment of the contactless ignition system of current interruption type according to the present invention will be described in detail with reference to the drawings. Referring to FIG. 1 which is a block circuit diagram of the ignition control section of the ignition system, a pulser device 1 generates two output signals in response to the rotation of an internal combustion engine. This pulser device 1 comprises a rotor 2 of a magnetic material rotating in synchronism with the rotation of the engine and having a lobe 2A on a portion of its outer periphery, a first pulser 3 sensing a crank position corresponding to a maximum advance position of the ignition timing thereby generating an output signal E indicative of the maximum advance position, and a second pulser 4 sensing a crank position corresponding to a minimum advance position of the ignition timing thereby generating an output signal D indicative of the minimum advance position. The output signal E appearing from the first pulser 3 includes a train of pulses each corresponding to one revolution of the rotor 2, as shown in FIG. 2(a). The output signal D appearing from the second pulser 4 includes a train of pulses each of which is delayed by a time $k_1T$ from the corresponding pulse of the output signal E of the first pulser 3, as shown in FIG. 2(b). An RS type flip-flop 5 is connected to the pulser device 1 to generate an output signal Q from its Q output terminal. This output signal Q has a waveform as shown in FIG. 2(c) in which it will be seen that the signal waveform starts to rise in response to the output signal E of the first pulser 3 and starts to fall in response to the output signal D of the second pulser 4. Accordingly, an output signal $\overline{Q}$ appearing from the $\overline{Q}$ output terminal of the RS type flip-flop 5 has a waveform as shown in FIG. 2(d).

The $\overline{Q}$ output terminal of the RS type flip-flop 5 is connected through a diode 6 to a connection point of base resistors 7 and 8 for a control transistor $T_1$ which is disposed in a preceding stage of a power transistor $T_2$, so that, when the control transistor $T_1$ is turned on, the power transistor $T_2$ is turned off, while when the control transistor $T_1$ is turned off, the control transistor $T_2$ is turned on. An ignition coil 9 is composed of a primary winding 91 and a secondary winding 92. The primary winding 91 of the ignition coil 9 is connected at one end thereof to the base resistor 7 for the control transistor $T_1$ together with one end of the secondary winding 92 and at the other end thereof to the collector of the power transistor $T_2$. The other end of the secondary winding 92 of the ignition coil 9 is connected to one terminal of a spark plug 10 which is grounded at the other terminal thereof.

A first ramp signal generating circuit 11 and a second ramp signal generating circuit 12 are connected in common to the Q and $\overline{Q}$ output terminals of the RS type flip-flop 5 so as to repeat a cycle of integration and resetting as will be described later. A comparing circuit 13 compares the output signals from the first and second ramp signal generating circuits 11 and 12, and its output is connected through a diode 14 to the connection point of the base resistors 7 and 8 for the control transistor $T_1$. These circuits 11, 12 and 13 act to advance the turn-on timing of the power transistor $T_2$. An ignition timing setting circuit 15 is also connected to the Q and $\overline{Q}$ output terminals of the RS type flip-flop 5 to provide an output signal for advancing the ignition timing, and this output signal is applied to the base of the control transistor $T_1$ through diodes 16 and 14. This ignition timing setting circuit 15 acts to determine the turn-off timing of the power transistor $T_2$.

In operation, the first ramp signal generating circuit 11 starts its integrating operation as soon as the output signal $\overline{Q}$ of the RS type flip-flop 5 turns into its high level from its low level, and is reset as soon as the signal $\overline{Q}$ turns into its low level again. Therefore, an output signal U having a waveform as shown in FIG. 2(e) appears from the first ramp signal generating circuit 11. On the other hand, the second ramp signal generating circuit 12 starts its integrating operation as soon as the output signal $\overline{Q}$ of the RS type flip-flop 5 turns into its low level from its high level, in contrary to the first ramp signal generating circuit 11. The second ramp signal generating circuit 12 terminates its integrating operation as soon as the signal $\overline{Q}$ turns into its high level again, and holds the integrated value until the signal $\overline{Q}$ turns into its low level from its high level. Therefore, an output signal V having a waveform as shown in FIG. 2(f) appears from the second ramp signal generating circuit 12. A voltage $V_E$ of a predetermined constant level is added to the output signal voltage U appearing from the first ramp signal generating circuit 11 to provide a signal voltage waveform W as shown in FIG. 2(g). This signal voltage W is compared in the comparing circuit 13 with the output signal voltage V of the constant level appearing from the second ramp signal generating circuit 12. This comparing circuit 13 is so constructed that an output signal X of low level appears therefrom when the level of the sum voltage W is higher than the level of the signal voltage V. When the rotation speed of the engine is lower than a predetermined setting, the comparing circuit 13 generates continuously the output signal X of high level as shown in FIG. 2(h), since the sum W of the output signal voltage U of the first ramp signal generating circuit 11 and the voltage $V_E$ of the constant level does not exceed the output signal voltage V of the second ramp signal generating circuit 12. When, however, the rotation speed of the engine exceeds the predetermined setting, the level of the sum voltage W exceeds that of the signal voltage V at a point P in FIG. 2(g), and the output signal X of the comparing circuit 13 is turned into and maintained in its low level during a period of time t in which the level of the sum voltage W is higher than that of the signal voltage V, as shown in FIG. 2(h).

As shown in FIGS. 2(a) and 2(b), assume that the period of time for one rotation of the rotor is T and the ratios of the time intervals between the pulse signal D of the pulser 3 and the pulse signal E of the pulser 4 succeeding thereto and between the pulse signal E and the next pulse signal D to the time period T are $k_1$ and $k_2$, respectively. As described above, the level of the ramp waveform output signal voltage V of the second ramp signal generating circuit 12 shown in FIG. 1 is equal at the point P in FIG. 2(g) to that of the sum W of the voltage $V_E$ and the ramp waveform output signal voltage U of the first ramp signal generating circuit 11 shown in FIG. 1. From this relation, the following equation (1) is obtained:

$$\frac{k_1T}{\tan\beta} = \frac{(k_2T - t)}{\tan\alpha} + V_E \quad (1)$$

where $\alpha$ and $\beta$ are the angles shown in FIGS. 2(e) and 2(f) respectively. By transforming the above equation (1) to find the period of time t during which the output signal X of the comparing circuit 13 is maintained in its low level, t is expressed as $$t = \left(\frac{k_2}{\tan\alpha} - \frac{k_1}{\tan\beta}\right)T + V_E\tan\alpha \quad (2)$$

Thus, when the angles $\alpha$ and $\beta$ are so determined as to provide the relation $$\left(\frac{k_2}{\tan\alpha} - \frac{k_1}{\tan\beta}\right) = 0,$$

the value of t is maintained constant independently of the value of T which is the reciprocal of the rotation speed of the engine in revolutions per minute.

The output signal $\overline{Q}$ of the RS type flip-flop 5 and the output signal X of the comparing circuit 13 are applied through an OR circuit composed of the diodes 6 and 14 to the connection point of the base resistors 7 and 8 for the control transistor $T_1$. As a consequence, an output signal waveform M as shown in FIG. 2(i) appears at this connection point and represents the logical sum of the signals $\overline{Q}$ and X. It will be seen from FIG. 2(i) that the control transistor $T_1$ is in its turned-off state and the power transistor $T_2$ is in its turned-on state in the low level portion of the signal waveform M. When the rotation speed of the engine is lower than the predetermined setting and the output signal X of the comparing circuit 13 is in its high level, the power transistor $T_2$ is turned on as soon as the output signal $\overline{Q}$ of the RS type flip-flop 5 disappears. On the other hand, when the rotation speed of the engine exceeds the predetermined setting, the power transistor $T_2$ is turned on as soon as the output signal X of the comparing circuit 13 drops to its low level. Therefore, at the engine rotation speed lower than the predetermined setting, the power transistor $T_2$ is turned on as soon as the output signal $\overline{Q}$ of the RS type flip-flop 5 turns into its low level from the high level as shown in FIG. 7, that is, at the maximum advance position determined by the position of the pulser 3. On the other hand, at the engine rotation speed higher than the predetermined setting, the turn-on timing of the power transistor $T_2$ is advanced in proportion to the rotation speed of the engine as shown in FIG. 8.

Figure 5:
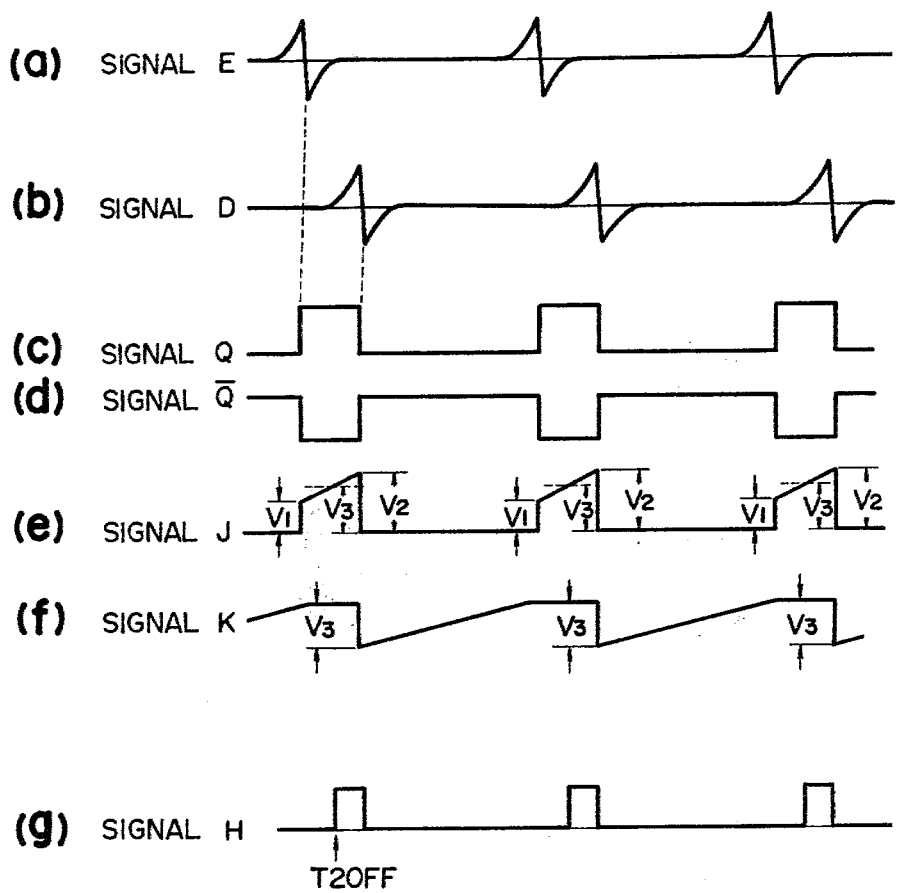

FIG. 4 a block circuit diagram showing in detail the structure of the ignition timing setting circuit 15. Referring to FIG. 4, a first integrating circuit 17 starts its integrating operation in response to the rising waveform portion of the output signal Q of the RS type flip-flop 5 and is reset in response to the falling waveform portion of the signal Q. A summing circuit 18 which may be an operational amplifier provides the sum of the output signal of the first integrating circuit 17 applied through a resistor 19 and a predetermined constant voltage $V_1$ which is derived from the output signal Q of the RS type flip-flop 5 applied through a resistor 20. The summing circuit 18 generates an output signal J having a waveform as shown in FIG. 5(e).

The output signals Q and $\overline{Q}$ of the RS type flip-flop 5 are applied to a second integrating circuit 21 in FIG. 4. This second integrating circuit 21 starts its integrating operation in response to the rising waveform portion of the signal $\overline{Q}$ and terminates its integrating operation in response to the falling waveform portion of the signal $\overline{Q}$, and the integration voltage $V_3$ thus obtained is held until the next rising waveform portion of the signal $\overline{Q}$ appears. This second integrating circuit 21 provides an output signal K having a waveform as shown in FIG. 5(f). A comparing circuit 22 compares the output signal K of the second integrating circuit 21 with the output signal J of the summing circuit 18 and generates an output pulse signal H having a waveform as shown in FIG. 5(g) when the level of the output signal J applied from the summing circuit 18 is higher than that of the output signal K applied from the second integrating circuit 21. The pulse in the output pulse signal H of the comparing circuit 22 is applied through the diode 16 to the base of the control transistor $T_1$ to advance the ignition timing.

When the rotation speed of the engine is lower than the predetermined setting, the level of the output signal K appearing from the second integrating circuit 21 is higher than that of the output signal J appearing from the summing circuit 18, and no output signal H appears from the comparing circuit 22. That is, the output pulse signal H does not appear from the comparing circuit 22 since the integration output voltage $V_3$ of the second integrating circuit 21 is higher than the output voltage $V_2$ of the summing circuit 18. When the rotation speed of the engine increases to such an extent that the integration output voltage $V_3$ of the second integrating circuit 21 lies intermediate between the constant voltage $V_1$ and the maximum integration voltage $V_2$, the comparing circuit 22 generates the ignition timing advancing pulse H corresponding to the rotation speed of the engine. When the rotation speed of the engine increases further to such an extent that the integration output voltage $V_3$ of the second integrating circuit 21 is now lower than the constant voltage $V_1$, the comparing circuit 22 generates its output pulse H as soon as the integrating circuits 17 and 21 start their integrating operation. Thus, the comparing circuit 22 generates its output pulse H at the maximum advance position of the ignition timing, and even when the rotation speed of the engine increases further, the rising waveform portion of the output pulse H appearing from the comparing circuit 22 is not advanced beyond the falling waveform portion of the output signal $\overline{Q}$ of the RS type flip-flop 5.

No pulse H appears from the ignition timing setting circuit 15 when the rotation speed of the engine is low, as will be understood from the above description. In that speed range, the turn-off timing of the power transistor $T_2$ is determined by the rising timing of the signal $\overline{Q}$. With a further increase in the rotation speed of the engine, the pulse H appears from the ignition timing setting circuit 15 and is applied to the base of the control transistor $T_1$ so that this transistor $T_1$ is turned on independently of the output signal $\overline{Q}$ of the RS type flip-flop 5. Therefore, the turn-off timing of the power transistor $T_2$ is advanced beyond the minimum advance position of the ignition timing as seen in FIG. 8. With a further increase in the rotation speed of the engine, the turn-off timing of the power transistor $T_2$ coincides finally with the maximum advance position of the ignition timing and is not advanced any further even when the rotation speed of the engine increases further.

Figure 3:
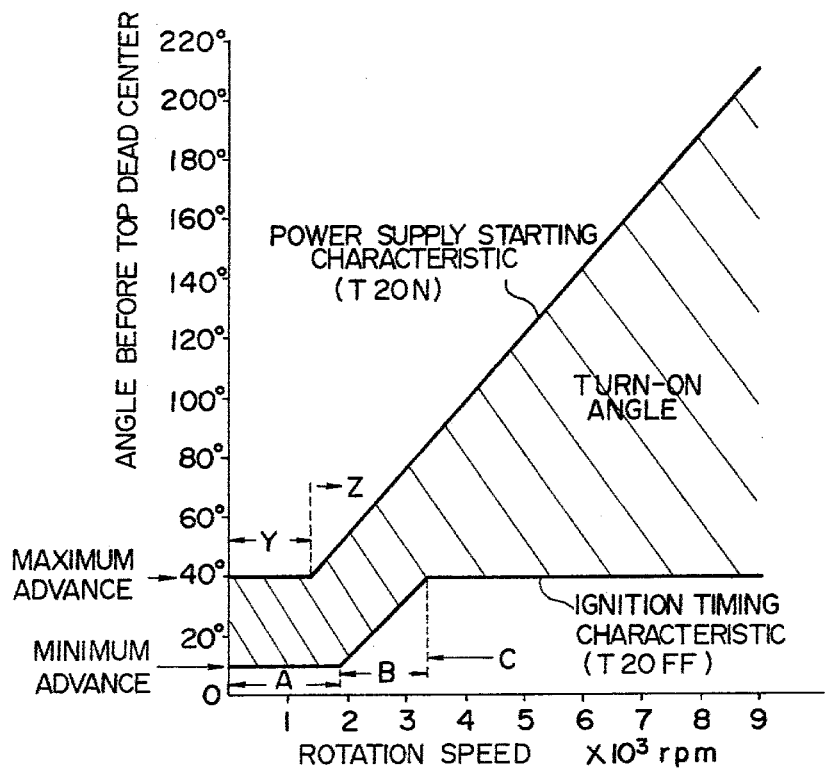
FIG. 3 is a graph showing the relation between the rotation speed of the engine and the turn-on angle for the power transistor in the embodiment of the present invention shown in FIG. 1.

FIG. 3 is a graph showing the relation between the turn-on angle for the power transistor $T_2$ and the rotation speed of the engine in revolutions per minute. In FIG. 3, the maximum advance position of the ignition timing determined by the first pulser 3 is shown to correspond to 40° before the top dead center (BTDC), while the minimum advance position of the ignition timing determined by the second pulser 4 is shown to correspond to 5° before the top dead center (BTDC), for the sake of illustration. The power supply starting characteristic curve representing the starting timing of power supply to the ignition coil 9, that is, the turn-on timing of the power transistor $T_2$ is maintained at the maximum advance position of the ignition timing within a speed range Y in which the rotation speed of the engine is lower than, for example, about 1,400 rpm. In a higher speed range Z, the turn-on timing of the power transistor $T_2$ is linearly advanced in proportional relation to the rotation speed of the engine. On the other hand, the ignition timing characteristic curve, that is, the turn-off timing of the power transistor $T_2$ is maintained at the minimum advance position of the ignition timing within a speed range A in which the rotation speed of the engine is lower than, for example, about 1,900 rpm. In a higher speed range B of from about 1,900 rpm to, for example, about 3,300 rpm, the turn-off timing of the power transistor $T_2$ is linearly advanced in proportional relation to the rotation speed of the engine. In a further higher speed range C exceeding about 3,300 rpm, the turn-off timing of the power transistor $T_2$ is maintained at the maximum advance position of the ignition timing. The interval between the power supply starting characteristic curve and the ignition timing characteristic curve corresponds to the turn-on angle for the power transistor $T_2$.

FIG. 6 is a graph in which the turn-on angle for the power transistor $T_2$ is expressed in terms of time. It will be seen in FIG. 6 that the lower the rotation speed of the engine, the longer is the duration of power supply to the power transistor $T_2$, since the turn-on angle for the power transistor $T_2$ is constant at the engine rotation speed lower than about 1,400 rpm as described above. Consequently, even with the low voltage supplied in the stage of starting the engine by actuating the starter, an amount of current enough to saturate the ignition coil 9 can be supplied to the ignition coil 9 thereby ensuring the sparking performance of the spark plug 10. In this low rotation speed range of the engine, the turn-on angle for the power transistor $T_2$ has the constant value corresponding to the interval between the maximum advance position and the minimum advance position of the ignition timing. Since this interval is determined by the mechanical positions of the pulsers 3 and 4, the desired stable ignition timing control can be reliably attained without being adversely affected by fluctuations in the power supply voltage in the engine starting stage, fluctuations in the rotation of the engine at very low rotation speeds, difficulties of integrating and summing operations due to increased periods, and any other factors. In the rotation speed range of from about 1,900 rpm to about 3,300 rpm, the turn-on timing of the power transistor $T_2$ is advanced in proportional relation to the increase in the rotation speed of the engine. In this speed range, the turn-off timing of the power transistor $T_2$ is also similarly advanced with the increase in the rotation speed of the engine and the duration of power supply to the power transistor $T_2$ tends to be slightly shortened with the increase in the rotation speed of the engine. However, this tendency is negligible and will not exert any appreciable adverse effect on the sparking performance. In the high rotation speed range higher than about 3,300 rpm, the turn-off timing of the power transistor $T_2$ is fixed at the maximum advance position of the ignition timing, and the turn-on timing is only advanced in proportional relation to the increase in the rotation speed of the engine. In this speed range, therefore, the duration of power supply to the power transistor $T_2$ is substantially constant. Thus, due to the fact that the power supply duration is controlled to be substantially constant in the intermediate and high rotation speed ranges of the engine, the current consumption increases with the increase in the rotation speed of the engine, so that the spark energy required for ignition in the high rotation speed range of the engine can be sufficiently provided, and the heat generated from the power transistor in the intermediate rotation speed range can also be minimized. According to the aforementioned embodiment of the present invention, the sparking performance can be maintained substantially constant with a minimum current consumption throughout the entire rotation speed range of the engine including the engine starting stage and the engine rotation at high speeds. Therefore, the ignition coil and power transistor employed in the system according to the present invention are smaller in size and less expensive than those employed in prior art systems of this kind.

What is claimed is:

1. A contactless ignition system of current interruption type for an internal combustion engine comprising a rotor of a magnetic material rotating in synchronism with the rotation of the engine and having means for sensing the ignition angle, means for controlling the advance of the ignition timing of the engine, a semiconductor switch circuit actuated by an ignition signal appearing from said advance control means, and an ignition coil connected to said semiconductor switch circuit, said advance control means comprising means for sensing a predetermined maximum advance position of the ignition timing, means for sensing a predetermined minimum advance position of the ignition timing, a first integrating circuit starting its integrating operation as soon as said maximum advance position sensing means senses the maximum advance position of the ignition timing and terminating its integrating operation as soon as said minimum advance position sensing means senses the minimum advance position of the ignition timing thereby generating a first ramp signal, a second integrating circuit starting its integrating operation as soon as said minimum advance position sensing means senses the minimum advance position of the ignition timing and terminating its integrating operation as soon as said maximum advance position sensing means senses the maximum advance position of the ignition timing thereby generating a second ramp signal, first summing means for providing an output signal representing the sum of a signal of a predetermined constant level and the output signal of said second integrating circuit, a first comparing circuit applying a power supply starting signal to said semiconductor switch circuit connected to said ignition coil when the level of the output signal of said first summing means coincides with the level of the output signal of said first integrating circuit; and an ignition timing setting circuit including a second summing means for providing an output signal representing the sum of a signal of a predetermined constant level and the output signal of said first integrating circuit, and including a comparison circuit for applying a turn-off signal to said semiconductor switch circuit when the level of the output signal of said second summing means coincides with the level of the output signal of said second integrating circuit.

2. A contactless ignition system of current interruption type for an internal combustion engine comprising a rotor of a magnetic material rotating in synchronism with the rotation of the engine and having means for sensing the ignition angle, means for controlling the advance of the ignition timing of the engine, a semiconductor switch circuit actuated by an ignition signal appearing from said advance control means, and an ignition coil connected to said semiconductor switch circuit, said advance control means comprising means for sensing a predetermined maximum advance position of the ignition timing, means for sensing a predetermined minimum advance position of the ignition timing, a first integrating circuit starting its integrating operation as soon as said maximum advance position sensing means senses the maximum advance position of the ignition timing and terminating its integrating operation as soon as said minimum advance position sensing means senses the minimum advance position of the ignition timing thereby generating a first ramp signal, a second integrating circuit starting its integrating operation as soon as said minimum advance position sensing means senses the minimum advance position of the ignition timing and terminating its integrating operation as soon as said maximum advance position sensing means senses the maximum advance position of the ignition timing thereby generating a second ramp signal, summing means for providing an output signal representing the sum of a signal of a predetermined constant level and the output signal of said second integrating circuit, a comparing circuit applying a power supply starting signal to said semiconductor switch circuit connected to said ignition coil when the level of the output signal of said summing means coincides with the level of the output signal of said first integrating circuit, and an ignition timing setting circuit connected to the inputs of said first and second integrating circuits for applying a turn-off signal to said semiconductor switch circuit.

3. A contactless ignition system as claimed in claim 2, wherein the conduction ratio representing the ratio between the turn-on duration and the turn-off duration of said semiconductor switch circuit is selected to correspond to that at the maximum advance position of the ignition timing in the low rotation speed range in the vicinity of the idling rotation speed of the engine.

4. A contactless ignition system as claimed in claim 2, wherein said ignition timing setting circuit is common-connected to said first and second integrating circuits.

* * * * *